2,806,570
Patented Sept. 17, 1957

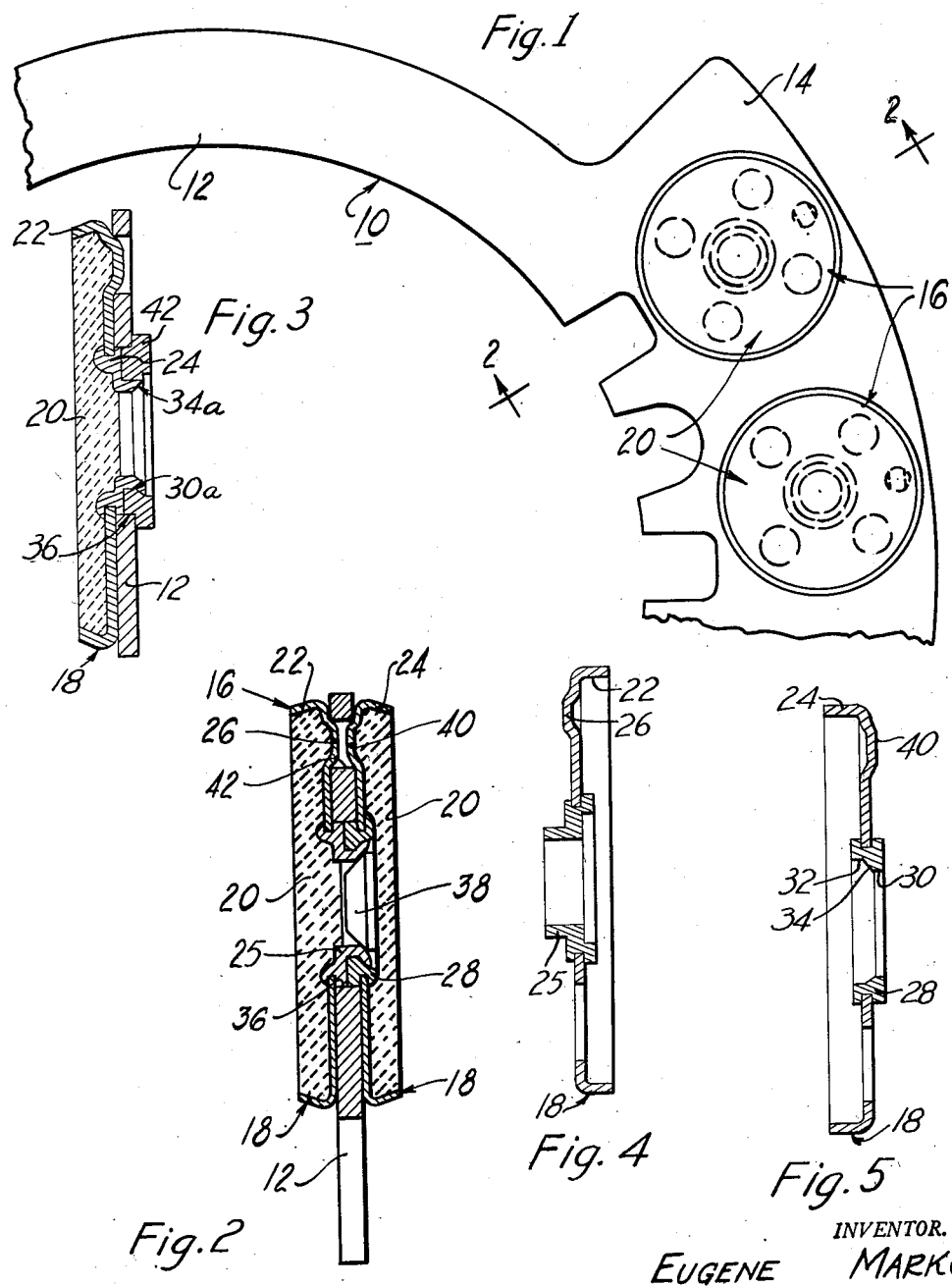

2,806,570
SUPPORTING DEVICE FOR FRICTION FACING

Eugene Markus, South Bend, Ind., assignor to Bendix Aviation Corporation, South Bend, Ind., a corporation of Delaware Application November 20, 1951, Serial No. 257,282

8 Claims. (Cl. 192—107)

The present invention relates to brake and clutch devices, and more particularly to friction elements used in said devices.

An object of the present invention is to provide a fastening means for a friction element to be used in a brake or clutch device, which is capable of withstanding heavy duty service in which the braking temperatures reach relatively high values.

A further object of this invention is to provide a method for fastening a friction element having a relatively long wear-life under heavy duty operating conditions.

A still further object of this invention is to provide a novel fastening means for attaching compacts of friction material to a brake supporting element.

Other objects will become apparent as the description proceeds.

In the drawings:

Figure 1 is a partial side elevation of an embodiment of this invention;

Figure 2 is a sectional view taken substantially on section line 2—2 of Figure 1;

Figure 3 is a section similar to Figure 2 and illustrates another form of this invention;

Figure 4 is a section of one of the cup elements shown in Figure 2; and

Figure 5 is an illustration of another cup element which may be fitted to the cup of Figure 4.

The illustrated embodiments of this invention are intended for use in an aircraft disc brake such as the one disclosed and claimed in Du Bois et al. Patent No. 2,483,362. Referring particularly to the drawings, an annular friction assembly 10, which in the present instance is designed for use as the stator friction element of an aircraft disc brake, is comprised of an annular steel support 12 having a radially outwardly extending portion 14 upon which friction linings or compacts 16 may be fastened.

In general, compacts 16 may be regarded as the prime friction-producing parts of the brake.

Each compact 16 essentially comprises a cup 18 stamped out of cold rolled steel and a quantity of compacted finely divided inorganic friction material 20 supported in said cup.

One of the novel features of this invention is the method of attaching the various compacts 16 to the annular support 12. With reference to Figure 2, the compact 22 may be regarded as a male fitting element while the compact 24 may be regarded as the female fitting element and adapted to interfit with the aforesaid male element 22.

Referring to Figure 4, it will be seen that the male element 22 comprises a cup 18 centrally apertured to receive a tubular part 25. This part 25 may be secured at one end in any suitable manner to the peripheral portion of the cup aperture with the axis of the tube being substantially coincident with that of the cup 18. A locating indentation 26 is preferably formed in the bottom of cup 18 for a purpose to be explained hereafter.

Referring next to Figure 5, the female element 24 also comprises a cup 18 centrally apertured to receive an annular fastener 28 which is suitably rigidly secured to the periphery of the aperture. This fastener is provided with stepped diameters 30 and 32 with an inclined annular surface 34 therebetween.

In fabricating the female part 24 a quantity of finely divided inorganic friction material is poured into the cup and compacted to a substantially solid state, and then suitably sintered to cause coalescence and secure adherence between finely divided particles. Obviously, in the process of compacting, some of the friction material will find its way to the regions surrounded by the diameters 30 and 32 and when this happens, such material must later be removed by any well known machining operation. Preferably, the friction material is removed from the axial extent of the fastener 28.

The male and female elements 22 and 24 are assembled to the support 12 in the following manner. First, the portion of fastener 28 which extends axially outwardly from the bottom of the female element 24 is inserted into a close fitting opening 36 in the support 12. Next, a riveting button 38 of substantially cylindrical shape and having a tapered end portion is placed inside the fastener 28 with the taper projecting outwardly from the friction material. The male part 22 is next assembled to the combination by inserting the axial extension of the tube 25 into the opening or annular space defined between the surface 34 of the fastener 28 and the tapered portion of the button 38. By applying compressive force axially on the two parts 22 and 24, the end of the tubular part 25 will be flared outwardly to conform with the tapered space between fastener surface 34 and the button 38. Thus, the two friction parts 22 and 24 are securely affixed in place to the support 12. The indentations 26 and 40 formed in the bottoms of the parts 22 and 24, respectively, may be inserted into a companion perforation 42 in the support 12, which is radially offset from the opening 36. By this means, the parts 22 and 24 are securely held against rotation.

The different embodiment of the present invention as illustrated in Figure 3 is for all intents and purposes the same as the foregoing described embodiment, the principal difference residing in the fact that only one side of the support 12 is provided with compacts. In this form of the invention, an annular fastener 42 having an inner-diameter 30a substantially identical to diameter 30 of the fastener 28, is assembled into the opening 36 of the support 12. This fastener is also provided with chamfered surface 34a which is substantially identical to surface 34 of Figure 5, and which, in assembled position, opens outwardly from the support 12. As was the case in the first-described embodiment, the tubular extension 25 of a male compact 22 is inserted into the opening 30a in such a manner as to place the compact on the side of the support 12 opposite the fastener 42. Next, a suitably tapered tool or other tool device is used to flare the right-hand end 44 of the tube 25 into rigid engagement with the inclined surface 34a. This flaring operation may be considered for practical purposes as being a riveting operation.

In disc brakes, such as the one disclosed in Du Bois et al. Patent No. 2,483,362, certain of the friction elements are provided with friction-producing linings or members on opposite sides for frictional engagement with relatively rotatable brake parts. Other of the friction elements may need friction lining or members on only one side, thus it is seen that the two different embodiments of the invention may be used in the same assembly.

While the particular described means for fastening the friction parts onto the annular supports are exemplified as being for use in brake devices, it is to be understood that the same fastening means may be used in other applications where the need for a strong and, easily assemblable fastening is needed. This fastening means as illustrated and described when formed of steel parts of suitable size will withstand relatively high shear loads and thereby serve the intended purpose of securing two or more friction-producing compacts on a supporting member.

Although several embodiments of the invention have been illustrated and described, various changes in the form and relative arrangements of the parts may be made to suit requirements.

I claim:

1. For use in a disc brake, a friction device comprising a flat annular supporting member, two friction-producing elements having oppositely-facing continuous friction surfaces, means securing said elements on opposite sides of said supporting member, said means comprising an annular fastener secured to one of said elements, said fastener being adapted to fit into an opening in said supporting member, and having an inclined inner peripheral surface, a tapered rivet button positioned inside said fastener within a cavity formed in the friction material of one of said friction-producing elements, and being juxtaposed with respect to said inclined surface, a tubular part secured to the other of said elements and adapted to be inserted into said fastener to contact said button in such a manner that the end thereof is flared radially outwardly and is formed between the aforementioned juxtaposed inclined and tapered surfaces.

2. For use in a disc brake, a friction device comprising a flat annular supporting member, two friction-producing elements having oppositely-facing continuous friction surfaces, means securing said elements on opposite sides of said supporting member, said means comprising a fastener secured to one of said elements and having an opening therethrough, a portion of said fastener being adapted to be inserted into an opening in said supporting member, an inclined surface provided around the periphery of said fastener opening, a cavity formed in the friction material of one of said elements without interrupting the oppositely-facing friction surface, a tapered rivet button positioned within said cavity with the tapered surface being disposed opposite and parallel to said inclined surface, a hollow rigid deformable part secured to the other of said elements and being disposed inside said fastener with the end thereof being deformed by said button when the button is caused to bear against the underside of the friction material to lie between the aforementioned inclined and tapered surfaces.

3. For use in a disc brake, a friction device comprising a flat annular supporting member, two friction-producing elements having oppositely-facing continuous friction surfaces, a cavity formed in the underside of one of said friction producing elements without interrupting the oppositely-facing continuous friction surface, means securing said elements on opposite sides of said supporting member, said means comprising an annular fastener secured to one of said elements, a tapered rivet button positioned within said cavity, said fastener being adapted to fit into an opening in said supporting member, and having an inclined inner peripheral surface, a tubular part secured to the other of said elements and adapted to be inserted into said fastener with the end thereof being flared by said rivet button as the rivet button is caused to bear against a portion of the friction producing element associated therewith, said tubular part thereby intimately engaging the inclined surface of said fastener.

4. For use in a disc brake, a friction device comprising a flat annular supporting member, two friction-producing elements having oppositely-facing continuous friction surfaces, a cavity formed in the underside of one of said elements without interrupting the oppositely-facing friction surface, means securing said elements on opposite sides of said supporting member, said means comprising a fastener secured to one of said elements and having an opening therethrough, a portion of said fastener being adapted to be inserted into an opening in said supporting member, means positioned within said cavity, an inclined surface provided around the periphery of said fastener opening, a hollow rigid deformable part secured to the other of said elements and being disposed inside said fastener with the end thereof being deformed by said tapered means when the tapered means is caused to bear against a portion of the friction producing element associated therewith, said deformable part thereby engaging said inclined surface and intimately securing said elements together.

5. For use in a disk brake, two friction producing elements having oppositely-facing continuous friction surfaces, an annular supporting member between said elements, fastening means interconnecting said elements through an opening in said support member and including a tubular deformable male member associated with one of said elements, an annular inclined surface female member associated with the other of said elements and a tapered rivet button positioned within a cavity formed in said other member and adapted to engage and flare the deformable male member into contact with said female member as the two elements are urged into engagement with said support member.

6. A friction device comprising two cup-shaped members arranged in back-to-back relation and having openings in the adjacent sides thereof, a compact affixed in each of said cup-shaped members to present oppositely-facing continuous friction surfaces, a support member extending between said cup-shaped members, a cavity formed in the compact of one of said members on the underside thereof, fastening means interconnecting the adjacent sides of said cup-shaped members through an opening in said support member, said fastening means including elements gripping the periphery of the openings in said cup-shaped members to resist lateral movement in either direction, a rivet button retained in said cavity, and a projection on one of said elements extending into the cavity with said rivet button being arranged to flare said projection as said cup-shaped members are forced together.

7. A friction device comprising two cup-shaped members arranged in back-to-back relation, a support member extending between said cup-shaped members, compacts affixed in each of said members to present two continuous oppositely-facing friction surfaces, a cavity formed in the underside of one of said members, said cavity being formed without interruption of the friction surface of said member, and fastening means extending through an opening in said support member, said fastening means including elements gripping the periphery of co-axial openings in adjacent sides of said compacts, a projection on one of said elements extending into the cavity formed in the one cup shaped member, and means positioned in said cavity and arranged to flare said projection by bearing against the underside of the one compact when the cup-shaped members are urged together.

8. In a brake, a friction device comprising two cup-shaped members arranged in back-to-back relation and having oppositely-facing continuous friction surfaces, a support member extending between said devices, a cavity formed in the underside of one of said cup-shaped members without interruption of the friction surface, and connecting means securing said cup-shaped members to said support member, said connecting means including elements gripping the adjacent undersides of said cup-shaped members to resist movement in either lateral direction, a projection on one of said elements extending through an opening in the support member into said cavity, and means positioned in said cavity for flaring said projection by bearing against the member wherein said cavity is formed.

References Cited in the file of this patent

UNITED STATES PATENTS

| | | |
|---|---|---|
| 80,791 | Wheeler | Aug. 4, 1868 |
| 295,593 | Thayer | Mar. 25, 1884 |
| 695,265 | Bartel | Mar. 11, 1902 |
| 1,954,521 | Cunningham | Apr. 10, 1934 |
| 2,178,527 | Wellman | Oct. 31, 1939 |
| 2,299,028 | Nutt et al. | Oct. 13, 1942 |
| 2,511,920 | Keller et al. | June 20, 1950 |

FOREIGN PATENTS

| | | |
|---|---|---|
| 499,589 | Great Britain | Jan. 19, 1939 |
| 528,773 | Great Britain | Nov. 6, 1940 |